(12) United States Patent
Ramakrishna et al.

(10) Patent No.: US 7,900,243 B2
(45) Date of Patent: Mar. 1, 2011

(54) METHOD AND SYSTEM FOR MANAGING EXECUTION OF AN APPLICATION MODULE

(75) Inventors: Srikanth Ramakrishna, Karnataka (IN); Suresh R. Warrier, Karnataka (IN)

(73) Assignee: Oracle America, Inc., Redwood City, CA (US)

( * ) Notice: Subject to any disclaimer, the term of this patent is extended or adjusted under 35 U.S.C. 154(b) by 1168 days.

(21) Appl. No.: 11/583,515

(22) Filed: Oct. 19, 2006

(65) Prior Publication Data

US 2008/0098465 A1     Apr. 24, 2008

(51) Int. Cl.
*G06F 21/00* (2006.01)

(52) U.S. Cl. ............................................. 726/7; 705/59

(58) Field of Classification Search ...................... 726/7, 726/5
See application file for complete search history.

(56) References Cited

U.S. PATENT DOCUMENTS

| | | | |
|---|---|---|---|
| 6,044,467 A | 3/2000 | Gong | |
| 6,088,452 A | 7/2000 | Johnson et al. | |
| 6,188,995 B1* | 2/2001 | Garst et al. | ............... 705/59 |
| 6,292,569 B1 | 9/2001 | Shear et al. | |
| 6,334,189 B1 | 12/2001 | Granger et al. | |
| 6,463,538 B1 | 10/2002 | Elteto | |
| 6,499,035 B1* | 12/2002 | Sobeski | ............... 707/103 |
| 6,557,105 B1* | 4/2003 | Frailong et al. | ............... 713/193 |
| 6,594,761 B1 | 7/2003 | Chow et al. | |
| 7,225,165 B1* | 5/2007 | Kyojima et al. | ............... 705/59 |
| 2006/0059100 A1* | 3/2006 | Ronning et al. | ............... 705/59 |

* cited by examiner

*Primary Examiner*—Matthew B Smithers
(74) *Attorney, Agent, or Firm*—Osha • Liang LLP

(57) ABSTRACT

A computer readable medium includes instructions for managing execution of an application module by receiving a request to execute the application module, where the application module is configured to execute on a virtual machine, retrieving license registration information and license status information associated with the application module, communicating the license registration information and the license status information to a license validation module to obtain an authorization response, where the license validation module is associated with the application module and registered with the virtual machine, and executing the application module, if the authorization response indicates that the license registration information and the license status information are valid.

14 Claims, 6 Drawing Sheets

METHOD AND SYSTEM FOR MANAGING EXECUTION OF AN APPLICATION MODULE

CROSS-REFERENCE TO RELATED CASES

The present application contains subject matter that may be related to the subject matter in U.S. patent application Ser. No. 10/758,976, titled "Virtual Machine Using Encrypted Class Files to Protect Object Code" and filed Jan. 16, 2004, the entire contents of which are incorporated herein by reference.

BACKGROUND

As computing devices become increasingly prevalent, software companies are developing more and more products to address a vast number of business and leisure activities. Accordingly, software companies are competing for an expanding customer base in a wide range of product areas.

Many of these companies choose to make available trial versions of their applications. However, in providing a trial version, companies must take care that customers retain an incentive to purchase the retail product. As such, companies typically restrict trial versions in one of two ways: by limiting the trial version to a subset of the features available in the complete product, or by providing a full set of features, with some or all of the features licensed for only a limited trial period.

One common method of restricting access to trial software is to record the date that the product was installed, and to allow execution of the software for only a certain number of days following the installation date. For example, a 30-day limited trial version may be fully functional for 30 days following initial installation, but may require a retail product key after those 30 days. This protection scheme is often easily circumvented by setting back the system clock on the computing device so that the application cannot identify when the trial license has expired.

Alternatively, an application may store the amount of time elapsed since installation in a persistent store. For example, in a Microsoft® Windows environment (Microsoft® is a registered trademark of the Microsoft Corporation), a counter is retained in the registry, or in another file on the hard drive. The counter is updated as time elapses, regardless of the specific date. Thus, trial license expiration is associated with a particular state of the counter, rather than with a particular day.

As an alternative to the aforementioned licensing mechanisms, software companies may choose to restrict access to a trial or retail version of an application, or one of its components, based on a user's credentials. Authorizing a user's credentials may require developing code directed to native system resources.

SUMMARY

In general, in one aspect, the invention relates to a computer readable medium comprising instructions for managing execution of an application module by receiving a request to execute the application module, wherein the application module is configured to execute on a virtual machine, retrieving license registration information and license status information associated with the application module, communicating the license registration information and the license status information to a license validation module to obtain an authorization response, wherein the license validation module is associated with the application module and registered with the virtual machine, and executing the application module, if the authorization response indicates that the license registration information and the license status information are valid.

In general, in one aspect, the invention relates to a system for managing execution of an application module, comprising the application module configured to perform a task initiated by a user, a license repository configured to store license registration information and license status information associated with the application module, a license validation module registered with a virtual machine and configured to authorize execution of the application module based on the license registration information and the license status information, and the virtual machine configured to retrieve the license registration information and the license status information from the license repository, communicate the license registration information and the license status information to the license validation module to obtain an authorization response, and execute the application module, if the authorization response indicates that the license registration information and the license status information are valid.

In general, in one aspect, the invention relates to a computer readable medium comprising instructions for managing execution of an application module by registering a license validation module with a virtual machine, wherein the license validation module is associated with the application module and the application module is configured to execute on the virtual machine, storing license registration information and license status information associated with the license validation module, and authorizing execution of the application module using the license validation module.

Other aspects of the invention will be apparent from the following description and the appended claims.

DETAILED DESCRIPTION

Figure 1:
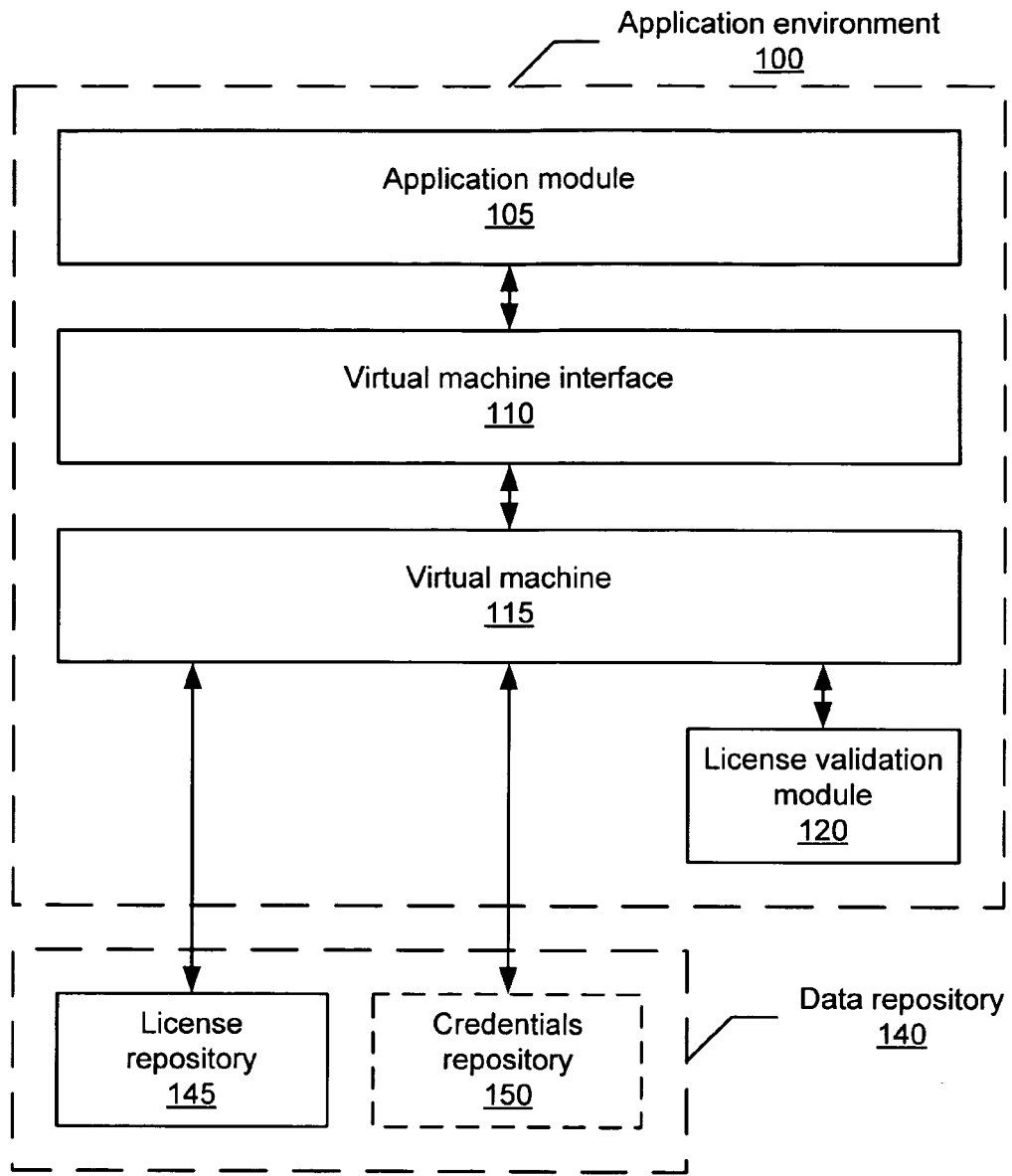
FIG. 1 shows a diagram of an application environment and a data repository in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for managing execution of an application module configured to execute on a virtual machine, using a license validation module associated with the application module and registered with the virtual machine.

FIG. 1 shows a diagram of a system in accordance with one embodiment of the invention. Specifically, the system includes an application environment (100), in which an application module (105) is configured to execute on a virtual machine (115) using a virtual machine interface (110). The application environment (100) further includes a license validation module (120) registered with the virtual machine. The system further includes a data repository (140) accessible by the virtual machine (115), containing a license repository (145) and, optionally, a credentials repository (150).

In one or more embodiments of the invention, the application module (105) may be a Java™ class (Java™ is a trademark of Sun Microsystems, Inc.), a Java™ package, a Microsoft® .NET application, or any other type of application module. Those skilled in the art will appreciate that the application module (105) may be a subcomponent of a larger application module, such as a method in a class, a class in a package, an application in an operating system, or any other type of subcomponent. In one or more embodiments of the invention, the virtual machine interface (110) may be a Java™ Application Program Interface, a Microsoft® .NET Framework Class Library, or any other type of virtual machine interface. In one or more embodiments of the invention, the virtual machine (115) may be a Java™ Virtual Machine, a Microsoft® .NET Common Language Runtime, or any other type of virtual machine.

In one or more embodiments of the invention, the license validation module (120) may be a dynamically linked library, a shared object, or any other type of executable module. Those skilled in the art will appreciate that the license validation module (120) may be any set of software or hardware instructions useable by the virtual machine (115) to authorize execution of the application module (105). Further, in one or more embodiments of the invention, the license validation module (120) may be associated with the application module (105). Those skilled in the art will appreciate that the license validation module (120) may also be associated with any number of other application modules (not shown).

In one or more embodiments of the invention, the license repository (145) may be a file in a file system, one or more tables in a database, one or more Microsoft® Windows registry keys, or any other type of repository. Those skilled in the art will appreciate that the license repository (145) may not be restricted to a single type of repository. Further, those skilled in the art will appreciate that the contents of the license repository (145) may be distributed across various components in the system (e.g., across multiple hard drives, etc.).

In one or more embodiments of the invention, the credentials repository (150) may be a Lightweight Directory Access Protocol (LDAP) server, a UNIX password file, one or more tables in a database, or any other type of repository. Those skilled in the art will appreciate that the credentials repository (150) may not be restricted to a single type of repository.

In one or more embodiments of the invention, the license validation module (120) may be installed in the application environment (100) as part of an installation package including the application module (105), separately from the application module (105), or by any other installation method. Those skilled in the art will appreciate that the license validation module (120) may be installed before, after, or concurrent with installing the application module (105).

Figure 2:
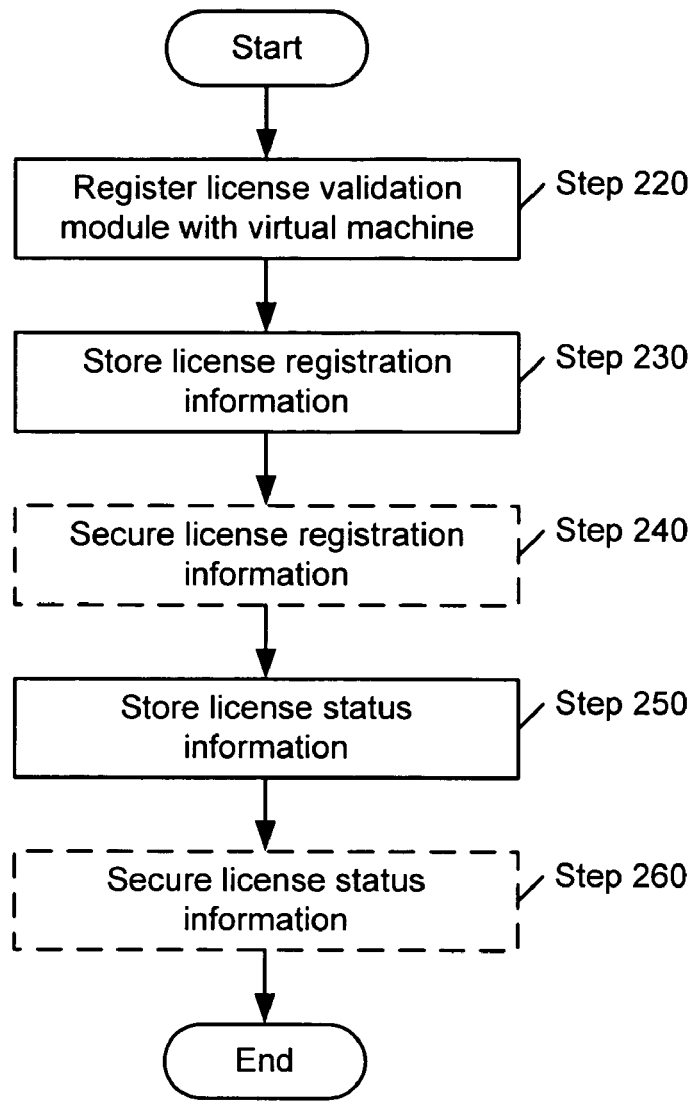
FIG. 2 shows a flow chart in accordance with one embodiment of the invention.

FIG. 2 shows a flow chart in accordance with one embodiment of the invention. Specifically, FIG. 2 shows a flow chart of a method for installing a license validation module. Initially, the license validation module is registered with a virtual machine (Step 220). In one or more embodiments of the invention, registering the license validation module with the virtual machine may prompt the virtual machine to execute any instructions necessary to make the license validation module useable by the virtual machine. Specifically, registering the license validation module with the virtual machine may prompt the virtual machine to store, and optionally secure, license registration information and license status information associated with the license validation module, as discussed below.

In one or more embodiments of the invention, registering the license validation module with the virtual machine may involve executing a registration module (not shown) implemented in the virtual machine, executing a native operating system module (not shown), executing a third-party registration module (not shown), or any other registration method.

Returning to discussion of FIG. 2, the virtual machine subsequently stores license registration information and license status information, described in detail below, in a license repository (Steps 230 and 250). In one or more embodiments of the invention, the virtual machine may also secure the license registration information and license status information (Steps 240 and 260). In one or more embodiments of the invention, securing the license registration information and license status information may prevent any unauthorized entity from modifying the license registration information and/or license status information. For example, the unauthorized entity may be a user attempting to circumvent a time-restricted license, malicious code acting on the license repository, or any other type of unauthorized entity.

In one or more embodiments of the invention, securing the license registration information (see FIG. 3) and license status information (see FIG. 3) may involve encrypting one or more elements of the license registration information and license status information, encrypting the entire license repository, protecting the license repository with a password, or any other similar form of security. Further, in one or more embodiments of the invention, securing the license registration information and license status information may be performed directly by the virtual machine or delegated by the virtual machine to another executable module (not shown). Those skilled in the art will appreciate that the license registration information and license status information may be stored and/or secured in any order, or concurrently. Further, those skilled in the art will appreciate that securing the license registration information may not necessitate securing the license status information, and vice versa.

Figure 3:
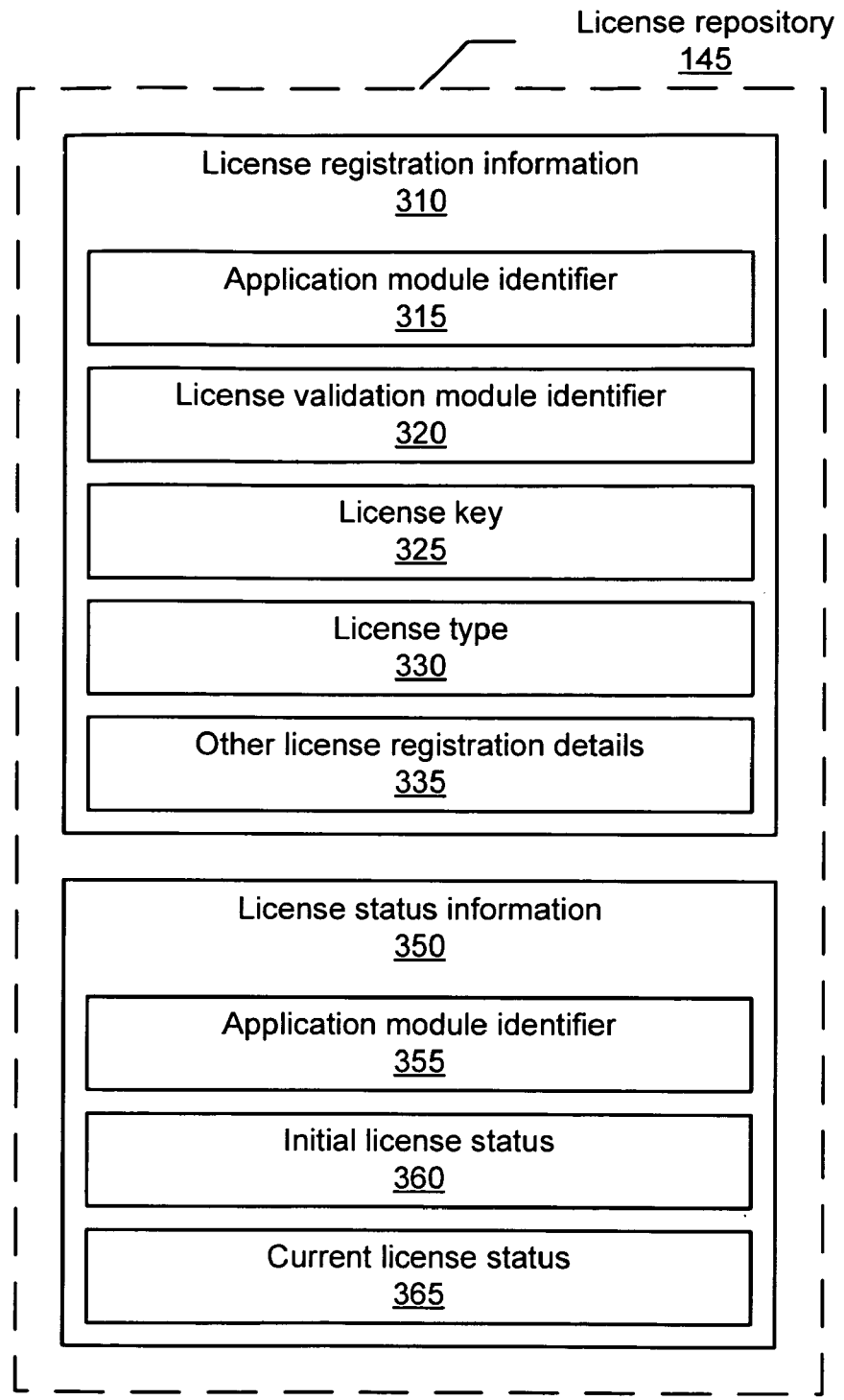
FIG. 3 shows a diagram of a license repository in accordance with one embodiment of the invention.

FIG. 3 shows a diagram of a license repository (145) in accordance with one embodiment of the invention. Specifically, in one or more embodiments of the invention, the license repository (145) includes license registration information (310) and license status information (350). In one or more embodiments of the invention, one or more elements of the license status information (350) may be part of the license registration information (310), or may be separate. Those skilled in the art will appreciate that when all elements of the license status information (350) are part of the license registration information (310), only one of the application module identifiers (315 and 355) is required.

In one or more embodiments of the invention, the license registration information (310) includes information about a license validation module and an application module. Specifically, in one or more embodiments of the invention, the license validation module identifier (320) identifies the license validation module with which the license registration information (310) is associated, and the application module identifier (315) identifies the application module (i.e., an application module configured to execute on a virtual machine, as discussed above) with which the license validation module is associated. In one or more embodiments of the invention, the license validation module identifier (320) and application module identifier (315) may be class names, library names, file paths, registry paths, hash table keys, database primary keys, or any other type of identifier. Those skilled in the art will appreciate that the license validation module identifier (320) and application module identifier (315) may not be the same type of identifier.

In one or more embodiments of the invention, the license key (325) is a security token required to authorize execution of the application module. For example, the license key (325) may allow the license validation module to differentiate between trial and retail versions of the application module. In one or more embodiments of the invention, the license key (325) may be input by a user during license validation module installation, supplied to the virtual machine without user input, or obtained by any other means.

In one or more embodiments of the invention, the license type (330) indicates the specific type of license validation that the license validation module will use to return an authorization response to the virtual machine. The authorization response is discussed in detail below. For example, a license type of "time-based" may indicate to the virtual machine that the license validation module will return an authorization response based on the amount of time elapsed since installation of the application module. Further, in one or more embodiments of the invention, the license type (330) may be associated with the number, type, and/or source of parameters that the virtual machine supplies to the license validation module.

In one or more embodiments of the invention, the license registration information (310) may include other license registration details (335), as required by the virtual machine and/or license validation module. Those skilled in the art will appreciate that one or more elements of the license registration information (310) may not be stored for a particular application module, depending on the requirements of the virtual machine and/or license validation module. Further, those skilled in the art will appreciate that the license repository (145) may include license registration information (310) for more than one application module and/or license validation module.

In one or more embodiments of the invention, the license status information (350) includes information about the initial and current status of a license. Further, the license status information (350) may be used to authorize execution of an application module. Specifically, the application module identifier (355) may indicate the application module to which the license status information (350) pertains. In one or more embodiments of the invention, the initial license status (360) may provide a baseline for comparison against the current license status (365). For example, for a time-based license, the initial license status (360) may contain the date and time when the application module was installed, and the current license status (365) may contain the amount of time elapsed since installation. Alternatively, in one or more embodiments of the invention, the initial license status (360) or current license status (365) may contain an internet protocol (IP) address, a username, an execution counter, or any other type of status information.

Those skilled in the art will appreciate that one or more elements of the license status information (350) may not be stored for a particular application module, depending on the requirements of the virtual machine and/or license validation module. Further, those skilled in the art will appreciate that the license repository (145) may contain license status information (350) for more than one application module and/or license validation module.

In one or more embodiments of the invention, the virtual machine may update the current license status (365) at regular intervals, when the application module is requested and/or terminates, or by any other updating scheme. Those skilled in the art will appreciate that for a time-based license, updating the current license status (365) by incrementing the amount of time elapsed since installation may prevent a user from circumventing the time-based license by setting back the system clock.

Figure 4A:
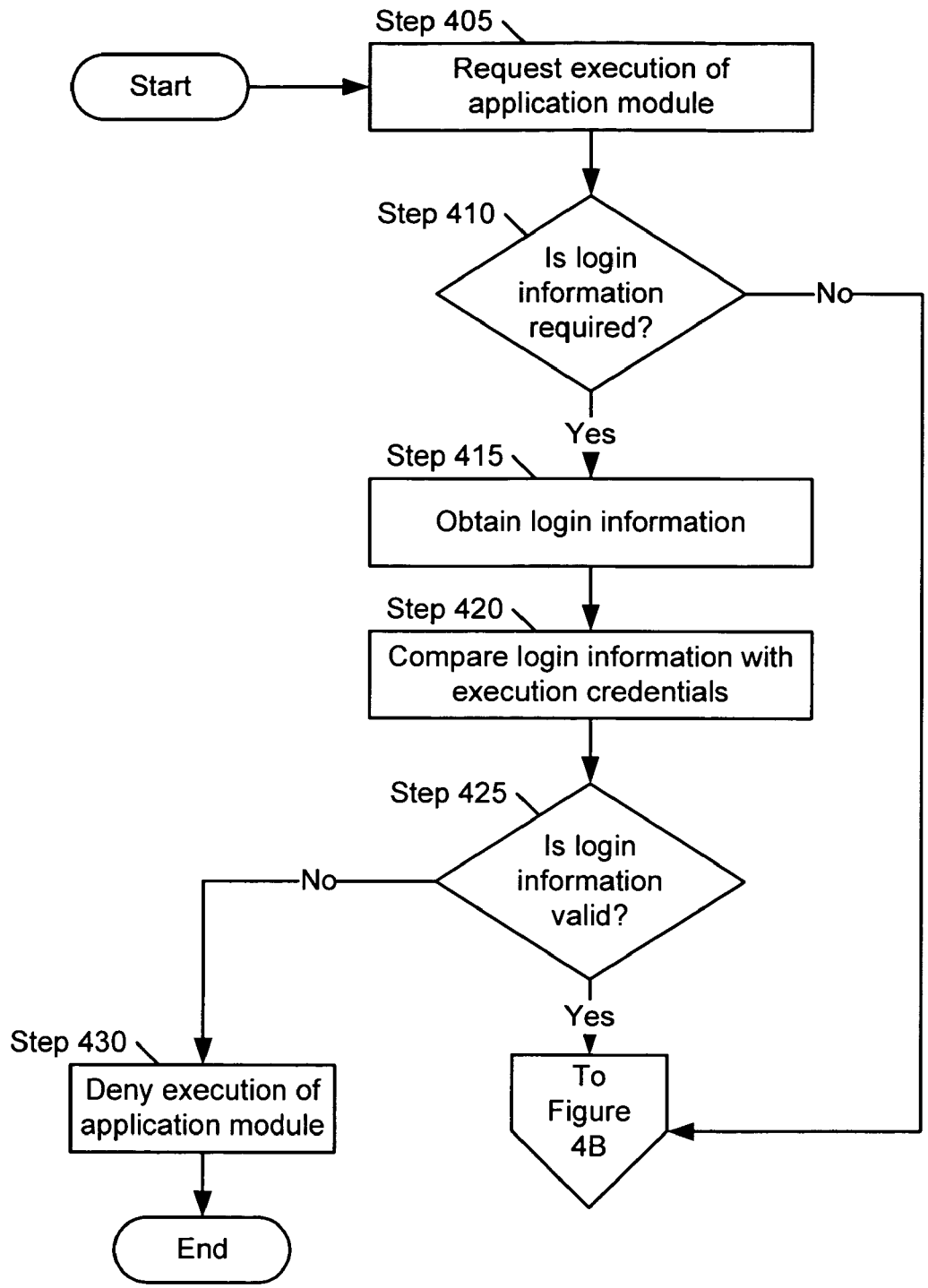
FIGS. 4A and 4B show a flow chart in accordance with one embodiment of the invention.

FIG. 4A shows a flow chart in accordance with one embodiment of the invention. Specifically, FIG. 4A shows a flow chart of a method for validating login information. Initially, a virtual machine receives a request to execute an application module (Step 405). In one or more embodiments of the invention, the request may originate in another application module (not shown), instructions executing on the virtual machine, hardware instructions (e.g., instructions generated by a circuit in an embedded device), or any other executable module.

In one or more embodiments of the invention, the request may be associated with a task initiated by a user. For example, the user may initiate the task by selecting an option from a menu in a graphical user interface, typing a command, issuing a voice command, or providing any other type of input. Those skilled in the art will appreciate that executing the application module may be associated with a subtask of the task initiated by the user, such as a function call originating in another executable module (not shown), a query for information required by the task, or any other type of subtask.

Returning to discussion of FIG. 4A, the virtual machine then receives a signal or token indicating whether login information is required to execute the application module (Step 410). In one or more embodiments of the invention, the signal or token may be a request from another application module (not shown), a security flag stored in a security repository (not shown) associated with the application module, a Boolean variable in volatile storage, or any other type of signal or token. If login information is not required, the method proceeds to Step 435 in FIG. 4B, discussed in further detail below.

If login information is required, then the virtual machine obtains the login information (Step 415). In one or more embodiments of the invention, the login information may be obtained from another application module (not shown), from a security repository (not shown) associated with the application module, by presenting an input prompt to a user, or from any other source. Those skilled in the art will appreciate that there are many ways to obtain login information, some of which require user input and some of which do not require user input.

Next, the virtual machine compares the login information with at least one execution credential from a credentials repository to obtain a match result indicating whether the login information is valid (Step 420). In one or more embodiments of the invention, the credentials repository stores at least one execution credential associated with one or more application modules that a user is authorized to execute. For example, in one or more embodiments of the invention, the credentials repository may store a username, a password, a permission flag, or any other type of execution credential.

In one or more embodiments of the invention, the match result may be obtained by querying the credentials repository with the login information, by retrieving at least one execution credential from the credentials repository and performing the comparison in the virtual machine, by querying a third-party module (not shown) with the login information and at least one execution credential, or by any other type of comparison. Those skilled in the art will appreciate that obtaining the match result may not be restricted to a single type of comparison.

Next, the virtual machine processes the match result to determine if the login information is valid (Step 425). In one or more embodiments of the invention, if the login information is not valid, the virtual machine denies execution of the application module (Step 430). For example, the virtual machine may communicate a denial response to the requesting module, terminate execution of the requesting module, present a denial dialog to the user, or use any other type of denial action. In one or more embodiments of the invention, if the login information is valid, the method proceeds to Step 435 in FIG. 4B.

Figure 4B:
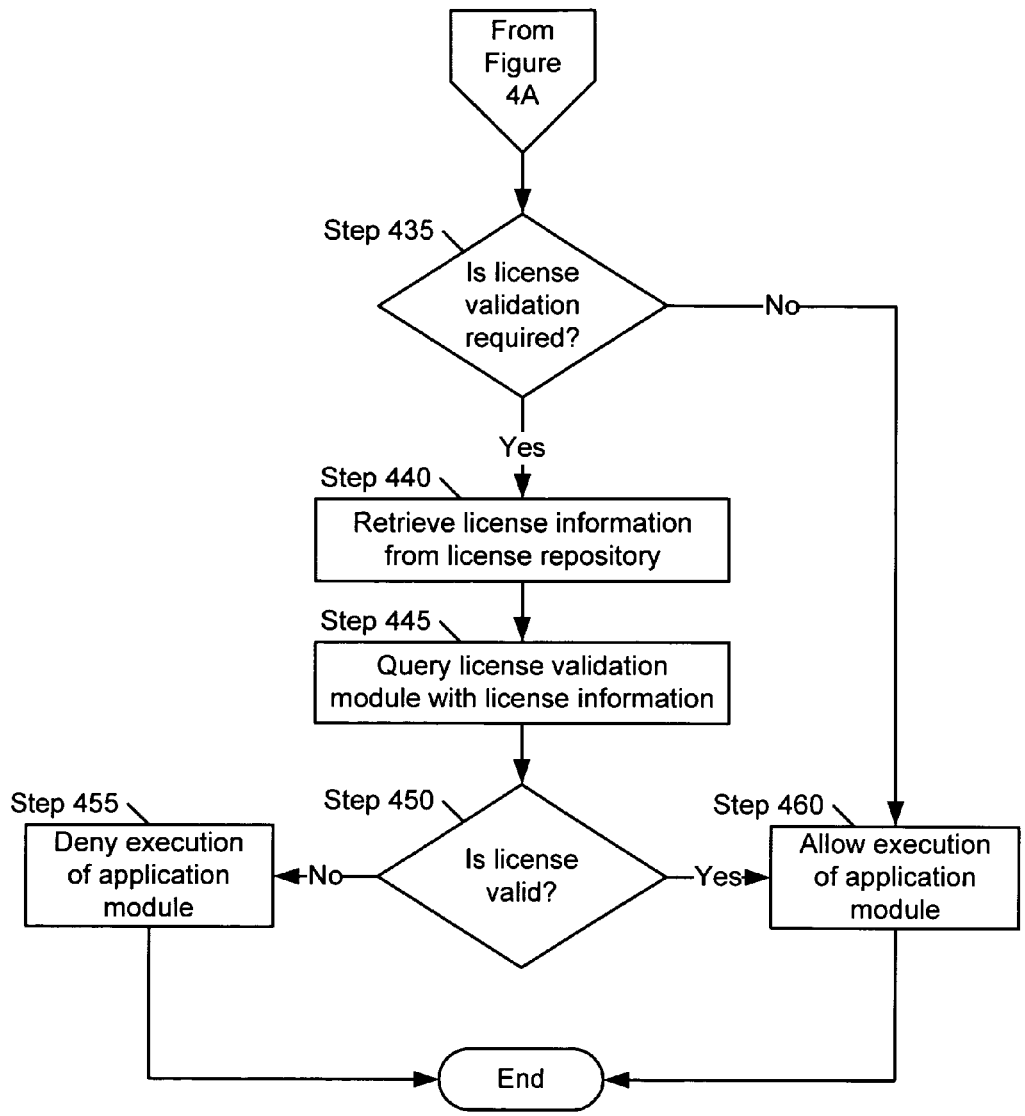

FIG. 4B shows flow chart in accordance with one embodiment of the invention. Specifically, FIG. 4B shows a flow chart of a method for validating a license. In one or more embodiments of the invention, at the start of the method of FIG. 4B, the virtual machine has already received a request to execute an application module, as discussed above. Those skilled in the art will appreciate that the license may be validated before, after, or concurrently with validating the login information. Further, those skilled in the art will appreciate that validating login information may not necessitate validating a license, and vice versa. Accordingly, in one or more embodiments of the invention, Step 405 of FIG. 4A may proceed directly to Step 435 of FIG. 4B.

Returning to discussion of FIG. 4B, the virtual machine receives a signal or token indicating whether license validation is required to execute the application module (Step 435). In one or more embodiments of the invention, the signal or token indicates whether an entry for the application module exists in license registration information and/or license status information contained in a license repository. In one or more embodiments of the invention, the virtual machine may receive the signal or token by querying the license repository, querying another software or hardware module (not shown) that interfaces with the license repository, performing a read operation on the license repository, referencing a cached copy of the license repository in volatile storage, or by any other method.

If license validation is not required, then the virtual machine allows execution of the application module (Step 460). For example, the virtual machine may issue an allowance reply to the requesting module, execute the application module, delegate execution of the application module to another module, or use any other type of allowance action.

If license validation is required, then the virtual machine retrieves license information from the license repository (Step 440). In one or more embodiments of the invention, the license information includes license registration information and license status information associated with the application module. Those skilled in the art will appreciate that the virtual machine may retrieve the license information directly from the license repository, from a cached copy of the license repository in volatile storage, or by any other means. Further, in one or more embodiments of the invention, the virtual machine may retrieve only one or more specific elements of the license registration information and license status information. The specific elements retrieved may depend, for example, on the application module being requested, a characteristic of the requesting module (not shown), or any other factor.

Next, the virtual machine communicates the license information to a license validation module to obtain an authorization response (Step 445). In one or more embodiments of the invention, the virtual machine identifies the license validation module to query by processing the license registration information to find a license validation module identifier that is associated with the application module identifier for the application module. In one or more embodiments of the invention, the virtual machine may similarly identify license registration information and/or license status information to include in the query. Specifically, the license registration information and/or license status information may be identified based on their association with one or more application module identifiers.

In one or more embodiments of the invention, the authorization response may be a signal, token, or any other type of authorization response indicating whether the license is valid. More specifically, in one or more embodiments of the invention, the authorization response may be an electrical signal, a Boolean variable, an integer, a data structure, or any other type of authorization response.

Returning to discussion of FIG. 4B, the virtual machine then processes the authorization response to determine whether the license is valid (Step 450). If the license is not valid, then the virtual machine denies execution of the application module (Step 455) by performing a denial action. Possible types of denial actions are discussed above in relation to Step 430 of FIG. 4A. Alternatively, if the license is valid, then the virtual machine allows execution of the application module (Step 460), as discussed above.

In one or more embodiments of the invention, after denying or allowing execution of the application module, the virtual machine may perform additional actions associated with login validation or license validation. For example, the virtual machine may terminate a connection with the credentials repository, terminate a connection with the license repository, write data from volatile storage to persistent storage, update a log file (not shown), or any other type of post-validation action.

In one or more embodiments of the invention, the virtual machine includes functionality to disable login validation or license validation during development of an application module. For example, login validation and/or license validation may be disabled by providing an argument to an application module compiler, or by any other means. Those skilled in the art will appreciate that disabling login validation and/or license validation during development of an application module may reduce the time required to develop the application module.

Those skilled in the art will appreciate that embodiments of the invention reduce the burden of developing an application module for multiple application environments by delegating responsibility for license management to the virtual machine. Further, those skilled in the art will appreciate that delegating responsibility for license management to the virtual machine may reduce or eliminate the need for a developer of the application module to develop code directed to native system resources.

In one or more embodiments of the invention, the virtual machine includes functionality for modules executing on the virtual machine to access license management functionality using a virtual machine interface (e.g., virtual machine interface (110) of FIG. 1). For example, the virtual machine may include functionality for a module to update a license key, request a current license status, or any other type of license management functionality. Those skilled in the art will appreciate that including license management functionality via a virtual machine interface increases the scope of license management functionality available to a developer or user of an application module.

In one or more embodiments of the invention, login validation and license validation, as discussed above, may be performed when the virtual machine receives a request to terminate execution of the application module. Those skilled in the art will appreciate that validating a login or license when the virtual machine receives a request to terminate execution the application module may prevent an unauthorized entity from terminating execution of the application module.

The following is an example of how the methods of FIGS. 2, 4A, and 4B may be applied in practice. Those skilled in the art will appreciate that the following descriptions are provided for exemplary purposes only, and should not be construed as limiting the scope of the invention or the appended claims.

Initially, a user executes an installation package for a trial version of a graphical editing application configured to execute on a Java™ Virtual Machine (JVM). During installation of the application, the installation package installs the Java™ package "patent.example.graphicsapp.*" containing the specific Java™ classes used by the application, and the Java™ class "patent.example.licensing" to serve as a license validation module for the application.

Next, the installation package registers the license validation module for the application with the JVM, via a Java™ Application Programming Interface (API). Specifically, the installation package provides the JVM with license registration information for the application. More specifically, the installation package provides the JVM with an application module identifier (i.e., "patent.example.graphicsapp.*"), a license validation module identifier (i.e., "patent.example.licensing"), a license key ("a1b2c3d4e5", which in this example indicates a trial version of the application), a license type ("timebased"), and a value ("1daplogin") indicating that a login with LDAP credentials is required to access the application.

In response to the registration request, the JVM stores the license registration information in a license repository: in this example, a structured query language (SQL) database. Further, the JVM stores license status information in the license repository, including an initial license status of "0" and a current license status of "0". No additional application module identifier is required for the license status information because, in this example, the JVM stores the license registration information and license status information together in the license repository. Prior to storing each value in the database, the JVM encrypts the value to prevent unauthorized access. Then, every 30 minutes from the time of installation, the JVM updates the current license status to indicate the total amount of time that has elapsed since installation. Thus, after 30 minutes, the current license status is "30," after 48 hours, the current license status is "2880," and after 30 days, the current license status is "43200."

Two days from installation, a user attempts to access the application, through the class "patent.example.graphicsapp.start". On receiving the request, the JVM determines whether login information is required to access the application. In this example, because the license repository contains a value indicating that a login is required to access any class in the package "patent.example.graphicsapp.*", the JVM prompts the user for a username and password. Once the user has entered a username and password, the JVM issues a native system call to an LDAP server to compare the username and password with valid credentials. If the username and/or password are not valid, then the JVM denies access to the application and presents a denial dialog to the user.

If the login is valid, then the JVM determines whether license validation is required, by checking the license repository for an entry corresponding with the application module being requested. In this example, since the application module being requested is in the package "patent.example.graphicsapp.*", license validation is required. Thus, the JVM retrieves the license validation module identifier, license key, license type, initial license status, and current license status (i.e., "2880", since two days have elapsed since installation) from the license repository.

The license validation module identifier indicates to the JVM which validation module to query, and the license type indicates to the JVM which of the values retrieved to include in the query. Specifically, based on the license validation module identifier and the license type, the JVM queries "patent.example.licensing" with the license key and the current license status. Based on the license key, the license validation module determines that the application is a trial version. In this example, the trial version is restricted to 30 days of use. Because the current license status is "2880" (i.e., two days), the license validation module returns a response indicating that the license is valid. Thus, the JVM allows access to the application module, by executing "patent.example.graphicsapp.start".

Thirty days later, a user again attempts to access the application through "patent.example.graphicsapp.start". In response to the request, the JVM again follows the steps described above. However, in this case, the current license status is "46080" (i.e., 32 days). Thus, the license validation module returns a response indicating that the license is no longer valid, and the JVM denies access to the application module. Those skilled in the art will appreciate that, in this example, the user was provided an opportunity to try the application for a period of 30 days, but no longer.

Figure 5:
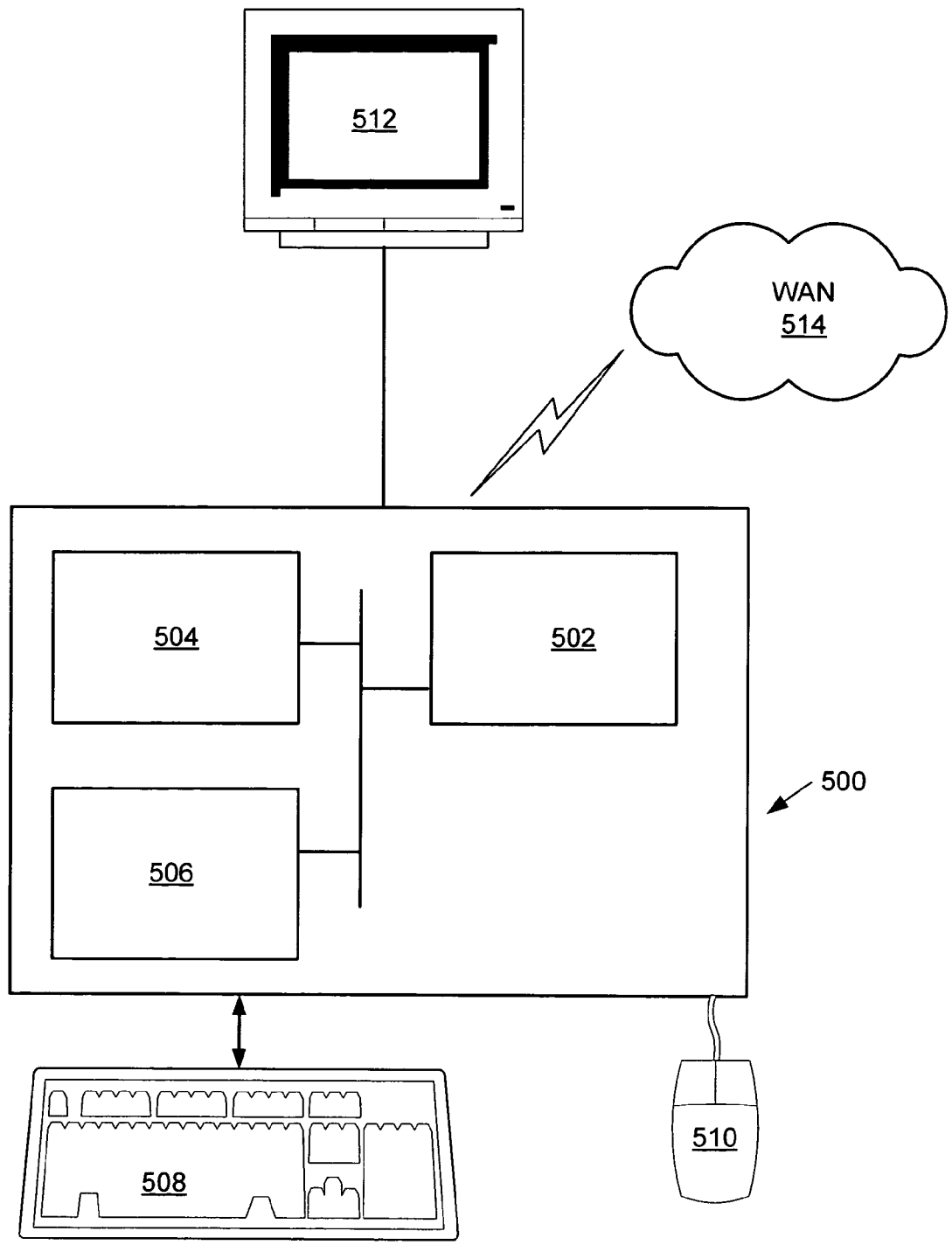
FIG. 5 shows a diagram of a computer system in accordance with one embodiment of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer system (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., application module, virtual machine interface, virtual machine, license validation module, license repository, credentials repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for managing execution of an application module, comprising:
   a processor;
   the application module configured to perform a task initiated by a user;
   a license repository configured to store license registration information and license status information associated with the application module, wherein the license registration information comprises a license validation module identifier that identifies a license validation module, and wherein the license repository is separate from the application module;
   the license validation module registered with a virtual machine and configured to authorize execution of the application module based on the license registration information and the license status information, wherein the license validation module is separate from the application module; and
   the virtual machine, when executed by the processor, is configured to:
      retrieve the license registration information and the license status information for the application module from the license repository, in response to a request to execute the application module;
      identify the license validation module using the license validation module identifier in the license registration information;
      communicate the license registration information and the license status information to the license validation module to obtain an authorization response; and
      execute the application module in response to the request, if the authorization response indicates that the license registration information and the license status information are valid.

2. The system of claim 1, further comprising:
   a credentials repository configured to store at least one execution credential associated with the user, and wherein the virtual machine is further configured to:
   request login information from the user; and
   compare the login information with the at least one execution credential to obtain a match result, wherein the virtual machine executes the application module only if the match result indicates that the login information is valid.

3. The system of claim 1, wherein the application module comprises a Java™ class.

4. The system of claim 1, wherein the license validation module is one of a plurality of license validation modules registered with the virtual machine.

5. The system of claim 1, wherein the virtual machine is further configured to retrieve the license registration information and the license status information from the license repository using an application module identifier associated with the application module.

6. The system of claim 1, wherein the license registration information comprises a license key identifying a license characteristic of the application module, and wherein the license validation module is further configured to use the license key to determine the authorization response.

7. The system of claim 1, wherein the license registration information comprises a license type, and wherein virtual machine is further configured to:
   select a subset of the license registration information and a subset of the license status information to communicate to the license validation module, based on the license type.

8. The system of claim 7, wherein the license type is time-based.

9. The system of claim 1, wherein the license status information comprises a current license status, and wherein the license validation module uses the current license status to determine the authorization response.

10. The system of claim 9, wherein the virtual machine is further configured to update the current license status at regular intervals.

11. The system of claim 1, wherein the license validation module comprises a dynamically linked library.

12. The system of claim 1, wherein the virtual machine comprises a Java™ Virtual Machine.

13. The system of claim 1, wherein the virtual machine is further configured to allow disabling of the license validation module during development of the application module.

14. A system for managing execution of an application module, comprising:
   a processor;
   the application module configured to perform a task initiated by a user;
   a license repository configured to store license registration information and license status information associated with the application module;
   a license validation module registered with a virtual machine and configured to authorize execution of the application module based on the license registration information and the license status information; and
   the virtual machine, when executed by the processor, is configured to:
      retrieve the license registration information and the license status information from the license repository;
      communicate the license registration information and the license status information to the license validation module to obtain an authorization response;
      execute the application module, if the authorization response indicates that the license registration information and the license status information are valid; and
   a credentials repository configured to store at least one execution credential associated with the user, wherein the credentials repository comprises a UNIX password file, and wherein the virtual machine is further configured to:
      request login information from the user; and
      compare the login information with the at least one execution credential to obtain a match result, wherein the virtual machine executes the application module only if the match result indicates that the login information is valid.

* * * * *